No. 721,925. PATENTED MAR. 3, 1903.
Z. R. TUCKER.
CLUTCH.
APPLICATION FILED JAN. 24, 1902.
NO MODEL.

WITNESSES:
H. L. Amer.
H. M. Seamans.

INVENTOR
Z. R. Tucker
BY
Duell Weymouth & Worfield
ATTORNEYS

UNITED STATES PATENT OFFICE.

ZECHARIAH RHODES TUCKER, OF PROVIDENCE, RHODE ISLAND, ASSIGNOR TO UNIVERSAL MACHINE COMPANY, OF PROVIDENCE, RHODE ISLAND, A CORPORATION OF RHODE ISLAND.

CLUTCH.

SPECIFICATION forming part of Letters Patent No. 721,925, dated March 3, 1903.

Application filed January 24, 1902. Serial No. 91,025. (No model.)

*To all whom it may concern:*

Be it known that I, ZECHARIAH RHODES TUCKER, residing at Providence, in the county of Providence and State of Rhode Island, have invented certain new and useful Improvements in Clutches, of which the following is a full, clear, and exact description, such as will enable others skilled in the art to which it appertains to make and use the same.

This invention relates to clutches, and has for its object to provide a clutch which shall be efficient in action, easily assembled and adjusted, and durable.

To this end the invention consists in the features of construction and combinations of elements which will be more fully set forth hereinafter and the novel features thereof pointed out in the claims at the end of this specification.

Figure 1:
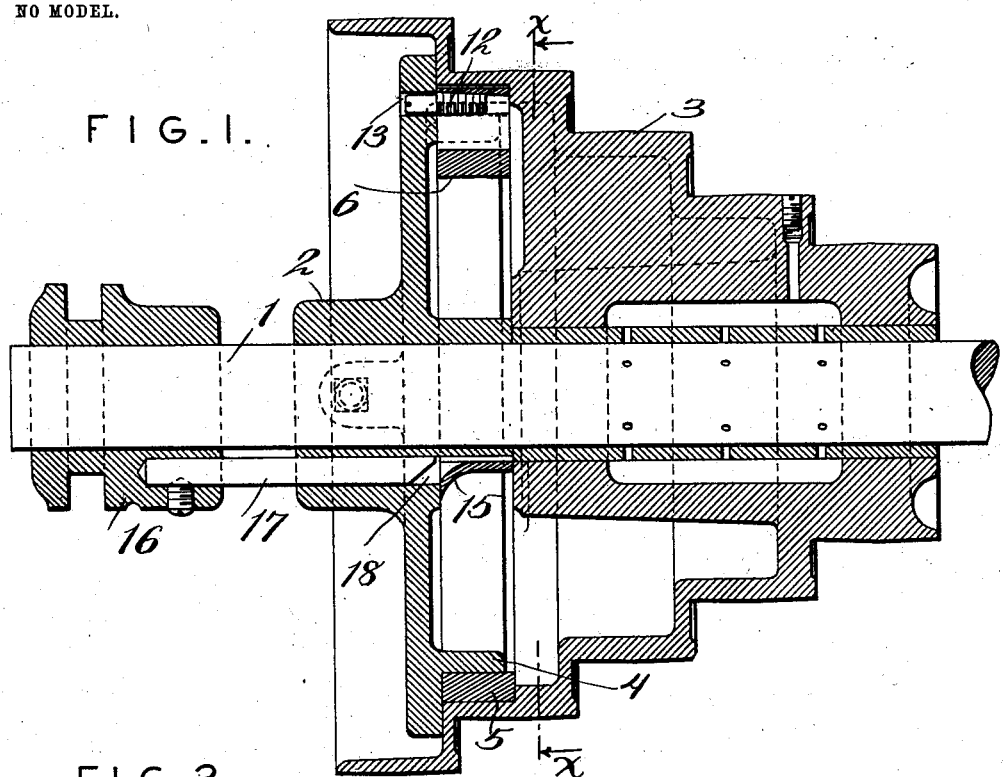
Figure 2:
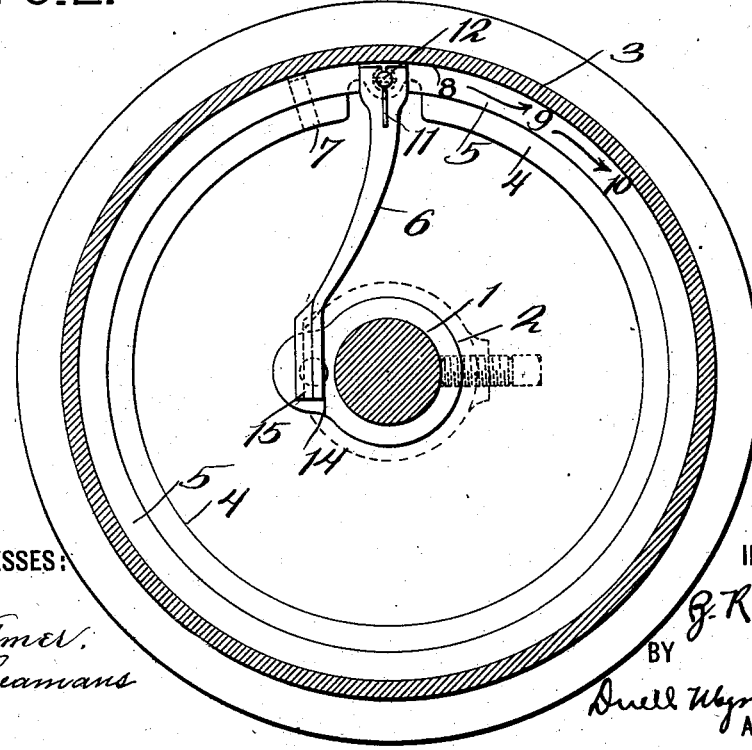

In the accompanying drawings, Figure 1 is a longitudinal vertical section showing a driving-shaft, cone-pulley, and my improved clutch as adapted to lock the said parts together. Fig. 2 is a transverse section on line *x x* of Fig. 1.

Throughout both views similar reference characters apply to similar parts.

For purposes of illustration this clutch is shown as applied to a cone-pulley; but it will be understood that it can be used wherever a clutch is desired.

Referring to the drawings, driving-shaft 1 carries a clutch-head 2, fastened thereto by a set-screw. Cone-pulley 3 is loosely mounted on the shaft. The clutch-head has a flange or rim 4, turned to receive the clutch-ring 5. This ring is turned to the proper size and cut open on one side to receive the end of the lever 6. It is then sprung into place on the clutch-head and fastened thereto by a pin. (Shown in dotted lines at 7, Fig. 2.) This pin is driven through the flange or rim 4 and has a sliding fit in the clutch-ring 5, and as it extends in a radial line from the center of the shaft it allows of a movement in a radial direction on the pin as the ring is extended by the movement of the lever 6 to fill the bore of the cone-pulley. The location of this pin is of importance, being best located near one end, in accordance with the direction in which the pulley revolves and as to whether the pulley is the driving or the driven member. According to these conditions the pin-hole would be on either side of the opening in the clutch-ring. In the present instance the clutch-head is the driver and the pulley is driven in the direction shown by the arrow in Fig. 2. The action of such ring is on the reverse principle to that of what is called "coil-friction." We will suppose that the point 8 at the end of the ring when extended comes in contact with the inner surface of the pulley 3. Then the friction between the surfaces caused by the resistance of the pulley tends to force that section of the ring immediately following in the direction of the arrow to the point 9 and increases the friction due to the pressure of the lever at this point. This in turn is augmented by the combined friction at 9 and increased friction at 10, and so on around the ring, so that when the entire circumference of the ring is traversed to the pin 7 the friction due to the action of the lever 6 is added to the accumulated friction of the grip on the inner surface of the pulley 3, as noted above.

To compensate for errors in fitting and wear of the clutch, the upper end or head of the lever 6 is split, as shown at 11, and a taper screw 12 is inserted, so that the end of the lever may be spread to fill the opening in the ring 5. The head or end of this screw 12 is inserted in a hole 13, drilled in clutch-head 2, and serves the purpose of keeping the lever in position. At the same time, being a free fit in the hole, as shown, it does not influence the action of the lever upon the clutch-ring. An advantage also results from this construction in that it is possible to adjust the screw 12 by inserting a screw-driver in the hole from the outside without taking the clutch apart. The lever 6 is offset, and its end rests against the flattened side 14 of the hub of the clutch-head. The inner side of the end of this lever is also cut away or turned back at an angle, as shown at 15. Sleeve 16, which is keyed to shaft 1 and may be reciprocated in any suitable manner, carries a pin 17, fastened therein by means of a set-screw. The hub of the clutch-head has a hole 18 drilled therein to receive the end of this pin, forming a guide and support therefor. The end of the pin 17 is cut away at an angle and when inserted under the end 15 of the lever 6 it will throw the lever, causing the upper end of said lever between the ends of the clutch-ring 5 to stand in a position more or less oblique, thereby forcing the ring open and against the inner side of the bore of the cone-pulley.

It will be seen that all the parts of this clutch are located between the clutch-head and the face of the cone-pulley, where they are out of the way and not likely to get out of order, while at the same time the clutch may be readily thrown by the movement of the sleeve 16, located inside of the clutch-head.

Having thus described my invention, what I claim as new, and desire to secure by Letters Patent, is—

1. In a clutch, in combination, a driving and a driven member, an expansible clutch-ring, a pivotally-mounted lever adapted to force apart the ends of said ring, said lever having an expansible head between the ends of said ring, a taper screw for expanding said head, and means for throwing said lever.

2. In a clutch, a driving and a driven member, a split ring 5 carried with said driving member and adapted to clutch said driven member, a lever 6 adapted to force apart the ends of said ring said lever being split at its upper end and a taper screw 12 tapped into said split upper end, the head of said screw being loosely mounted to allow pivotal movement of said lever.

3. In combination, a driving-shaft, a cone-pulley loosely mounted thereon, a clutch-head 2 carried with said driving-shaft, a split clutch-ring 5 connected to said clutch-head, a split lever 6 having its split end located between the ends of said split ring, a taper screw 12 tapped into said split lever the head of said screw being loosely mounted in an aperture 13 in said clutch-head, a pin 17 reciprocable through a guiding-hole in said clutch-head the other end of said lever 6 being extended into the path of movement of said pin 17 and having its end cut away at an angle whereby it is adapted to be thrown by the reciprocation of said pin 17, substantially as and for the purposes set forth.

4. In combination, a driven member having a clutch-surface in connection therewith, a clutch-head carrying a split ring between said clutch-head and said driven member, a lever for expanding said clutch-ring also located between said clutch-head and said driven member and means whereby the relation between said clutch-ring and said expanding-lever may be varied, the point of application of said means being from the outside of said clutch-head.

In testimony whereof I affix my signature in the presence of two witnesses.

ZECHARIAH RHODES TUCKER.

Witnesses:
ALICE H. ABORN,
HENRY C. BABCOCK.